(12) United States Patent
Liang

(10) Patent No.: US 7,669,425 B2
(45) Date of Patent: Mar. 2, 2010

(54) CLOSED LOOP TURBINE COOLING FLUID REUSE SYSTEM FOR A TURBINE ENGINE

(75) Inventor: George Liang, Palm City, FL (US)

(73) Assignee: Siemens Energy, Inc., Orlando, FL (US)

( * ) Notice: Subject to any disclaimer, the term of this patent is extended or adjusted under 35 U.S.C. 154(b) by 604 days.

(21) Appl. No.: 11/586,453

(22) Filed: Oct. 25, 2006

(65) Prior Publication Data

US 2008/0098749 A1    May 1, 2008

(51) Int. Cl.
*F02C 7/12* (2006.01)
*F02C 7/18* (2006.01)

(52) U.S. Cl. .......................... 60/806; 415/115

(58) Field of Classification Search ............ 60/806; 415/115
See application file for complete search history.

(56) References Cited

U.S. PATENT DOCUMENTS

| | | | |
|---|---|---|---|
| 3,936,215 A | 2/1976 | Hoff | |
| 4,127,988 A * | 12/1978 | Becker | 60/806 |
| 4,358,926 A * | 11/1982 | Smith | 415/115 |
| 4,719,747 A * | 1/1988 | Willkop et al. | 60/785 |
| 4,721,433 A | 1/1988 | Piendel et al. | |
| 5,163,285 A * | 11/1992 | Mazeaud et al. | 60/806 |
| 5,317,877 A * | 6/1994 | Stuart | 60/806 |
| 5,342,172 A | 8/1994 | Coudray et al. | |
| 5,394,687 A * | 3/1995 | Chen et al. | 60/806 |
| 5,488,825 A | 2/1996 | Davis et al. | |
| 5,498,126 A | 3/1996 | Pighetti et al. | |
| 5,581,996 A * | 12/1996 | Koch et al. | 60/785 |
| 5,626,462 A | 5/1997 | Jackson et al. | |
| 5,680,767 A * | 10/1997 | Lee et al. | 415/115 |
| 5,782,076 A * | 7/1998 | Huber et al. | 60/782 |
| 6,065,282 A * | 5/2000 | Fukue et al. | 60/806 |
| 6,241,467 B1 | 6/2001 | Zelesky et al. | |
| 6,254,334 B1 | 7/2001 | LaFleur | |
| 6,511,293 B2 | 1/2003 | Widrig et al. | |
| 6,672,074 B2 | 1/2004 | Tiemann | |
| 6,722,138 B2 | 4/2004 | Soechting et al. | |
| 6,808,367 B1 | 10/2004 | Liang | |
| 2002/0108379 A1* | 8/2002 | Akiyama et al. | 60/806 |
| 2002/0148213 A1 | 10/2002 | Yu | |
| 2002/0182056 A1 | 12/2002 | Widrig et al. | |
| 2003/0167775 A1 | 9/2003 | Soechting et al. | |
| 2004/0088995 A1 | 5/2004 | Reissig | |
| 2005/0022535 A1* | 2/2005 | Palmisano et al. | 60/772 |

* cited by examiner

*Primary Examiner*—Ted Kim

(57) ABSTRACT

A cooling fluid reuse system for a turbine engine for capturing spent cooling fluids from row one turbine vanes and directing those fluids into a mixing chamber to be mixed with liner cooling fluids and used in a combustor. The cooling fluid reuse system may be formed from a fluid channel extending from the a cooling fluid collection channel in the first row of turbine vanes, through a rotor cooling fluid collection chamber in the rotor assembly, through a cooling fluid manifold, and into the at least one mixing chamber.

7 Claims, 1 Drawing Sheet

CLOSED LOOP TURBINE COOLING FLUID REUSE SYSTEM FOR A TURBINE ENGINE

FIELD OF THE INVENTION

This invention is directed generally to turbine airfoils, and more particularly to cooling fluid reuse systems in turbine engines.

BACKGROUND

Typically, gas turbine engines include a compressor for compressing air, a combustor for mixing the compressed air with fuel and igniting the mixture, and a turbine blade assembly for producing power. Combustors often operate at high temperatures that may exceed 2,500 degrees Fahrenheit. Typical turbine combustor configurations expose turbine blade assemblies to these high temperatures. As a result, turbine blades and turbine vanes must be made of materials capable of withstanding such high temperatures. Turbine blades, vanes and other components often contain cooling systems for prolonging the life of these items and reducing the likelihood of failure as a result of excessive temperatures.

Typically, turbine vanes extend radially inward from a vane carrier and terminate within close proximity of a rotor assembly. The turbine vanes typically include a plurality of cooling channels positioned in internal aspects of the turbine vanes. Cooling fluids, such as air, are passed through the cooling channels in the vanes. The cooling fluids are then exhausted from the turbine vanes into the combustor gases.

The turbine engine also includes a mixing chamber that receives cooling fluids used to cool the liner of the combustor. These cooling fluids are feed from the combustor, through cooling channels in the liner, into the mixing chamber, and into the combustor. Use of cooling fluids from the compressor reduces the efficiency of the turbine engine. Thus, a need exists for more efficient use of cooling fluids extracted from the compressor of a turbine engine to increase the overall efficiency of the turbine engine.

SUMMARY OF THE INVENTION

This invention relates to a cooling fluid reuse system for a turbine engine for capturing spent cooling fluids from turbine vanes and directing those fluids into a mixing chamber to be mixed with liner cooling air and used in a combustor. The cooling fluid reuse system may be formed from a fluid channel extending from one or more cooling fluid collection channels in the first row of turbine vanes, through a rotor cooling fluid collection chamber in the rotor assembly, through one or more cooling fluid manifolds, and into the at least one mixing chamber to capture the spent cooling air from the turbine vanes and redirect the fluids to the combustor. Such a configuration reduced the amount of air taken from the combustor, which increases the efficiency of the turbine engine.

The turbine engine in which the cooling fluid reuse system is mounted may include one or more combustors positioned upstream from a rotor assembly including a plurality of blades extending radially from a rotor. The turbine engine may also include a first row of turbine vanes attached to a vane carrier, wherein the turbine vanes each extend radially inward and terminate proximate to the rotor assembly. A rotor cooling fluid collection chamber may be positioned in the rotor assembly and one or more cooling fluid channels may be positioned in at least some of the turbine vanes in fluid communication with the rotor cooling fluid collection chamber in the rotor assembly. The turbine engine may also include one or more mixing chambers positioned upstream of the at least one combustor and in fluid communication with the combustor. The turbine engine may include one or more cooling fluid manifolds in fluid communication with the rotor cooling fluid collection chamber in the rotor assembly and in fluid communication with the at least one mixing chamber forming a cooling fluid reuse system of a fluid channel extending from the at least one cooling fluid collection channel in the first row of turbine vanes, through the rotor cooling fluid collection chamber in the rotor assembly, through the at least one cooling fluid manifold, and into the at least one mixing chamber. The turbine engine may also include one or more pumps for pressurizing the captured cooling fluid in the rotor cooling fluid collection chamber in the rotor assembly. In one embodiment, the pump may be a mini-disc.

An advantage of this invention is that capturing the spent cooling air from the turbine vanes and directing the cooling fluids to the mixing chamber to be used in the combustor increases the efficiency of the turbine engine by reducing the amount of cooling and leakage air consumed by the engine.

These and other embodiments are described in more detail below.

BRIEF DESCRIPTION OF THE DRAWINGS

The accompanying drawing, which is incorporated in and form a part of the specification, illustrates an embodiment of the presently disclosed invention and, together with the description, disclose the principles of the invention.

The FIGURE is a cross-sectional view of a portion of a turbine engine including a cooling fluid reuse system of this invention.

DETAILED DESCRIPTION OF THE INVENTION

Figure 1:
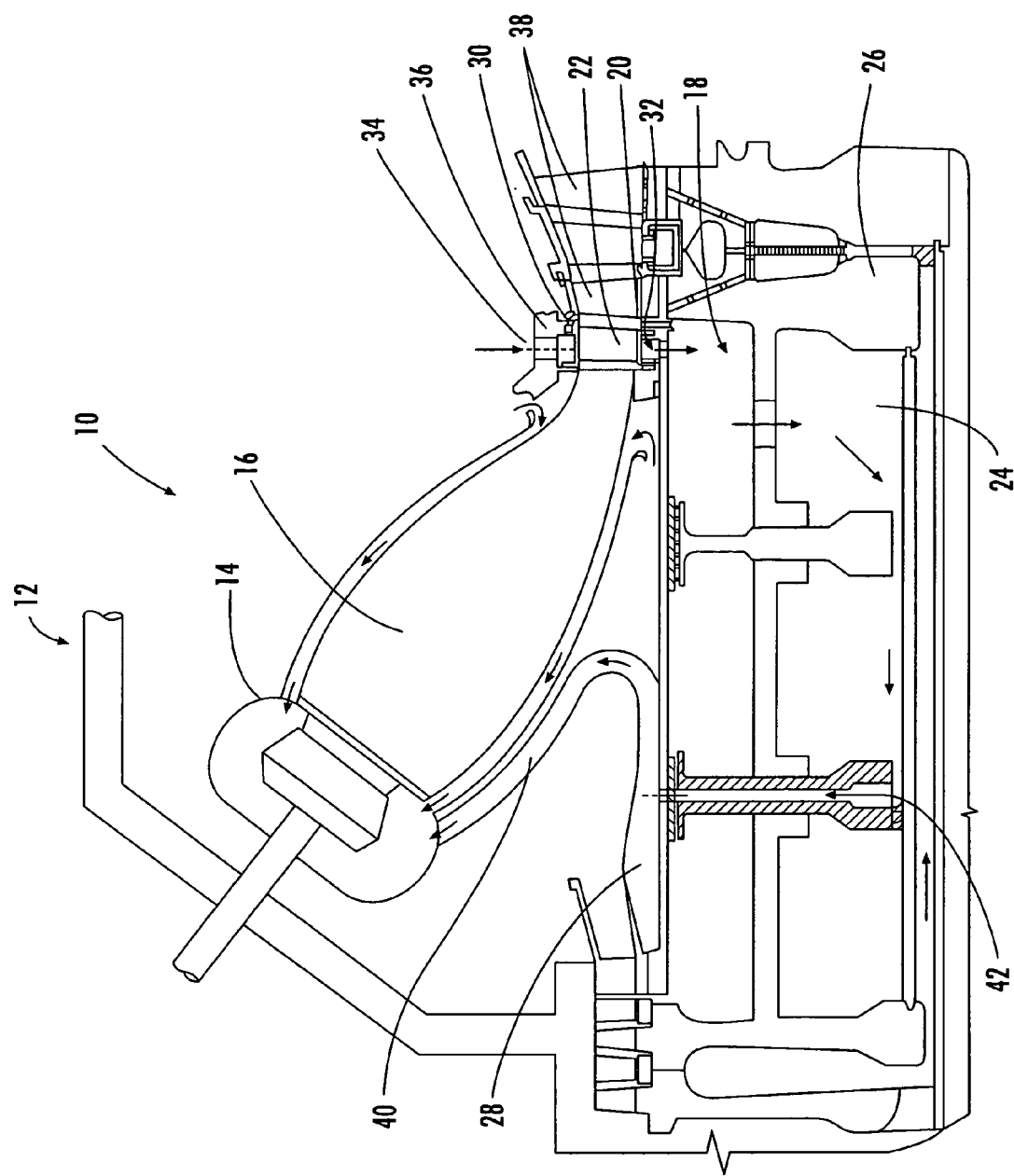

As shown in the FIGURE, this invention is directed to a cooling fluid reuse system 10 for a turbine engine 12 for capturing spent cooling fluids and directing those fluids into a mixing chamber 14 to be mixed with liner cooling air and used in a combustor 16. Capturing spent cooling fluids and using those in the combustion process increases the efficiency of the turbine engine 12. The cooling fluids may be, but are not limited to, cooling air. In one embodiment, the cooling fluid reuse system 10 may be configured to capture cooling fluids exhausted from row one turbine vanes 22. In particular, the cooling fluid reuse system 10 may include a fluid channel 18 extending from a cooling fluid collection channel 20 in a first row of turbine vanes 22, through a rotor cooling fluid collection chamber 24 in a rotor assembly 26, through a cooling fluid manifold 28, and into the mixing chamber 14 in fluid communication with the combustor 16.

The cooling fluid reuse system 10 may be configured to capture cooling fluids flowing through row one turbine vanes 22 rather than allowing the cooling fluids to be exhausted into the combustion gases. The turbine vanes 22 may include one or more cooling fluid collection channels 20 extending radially inward from an OD 30 of the turbine vane 22 to an ID 32 of the turbine vane 22. The cooling fluid collection channel 20 may be in fluid communication with a cooling fluid supply channel 34 that is outboard of the turbine vane 22. The turbine vanes 22 may be rigidly attached to a vane carrier 36 positioned radially outward from the turbine vanes 22.

As shown in the figure, the turbine engine 12 may include a rotor assembly 26 positioned radially inward from the vane carrier 36 and the turbine vanes 22. The rotor assembly 26 may include turbine blades 38 extending radially outward from the rotor assembly 26. As shown in the figure, the turbine blades 38 may be assembled into rows, which are also referred to as stages.

The cooling fluid reuse system 10 may include a rotor cooling fluid collection chamber 24 positioned in the rotor assembly 26 for collecting the cooling fluids passing through the turbine vane 22. The rotor cooling fluid collection chamber 24 may have any configuration necessary to prevent interference with operation of the rotor assembly 26 and contain the captured cooling fluids from the turbine vanes 22. In at least one embodiment, the rotor cooling fluid collection chamber 24 may be partially formed from a radially extending cylinder 40.

The cooling fluid reuse system 10 may also include a cooling fluid manifold 28 configured to collect cooling fluids from the rotor cooling fluid collection chamber 24. The cooling fluid manifold 28 may be sized to collect cooling fluids passed from the radially extending cylinder 40. The cooling fluid manifold 28 may be in fluid communication with the mixing chamber 14 to direct the cooling fluids into the mixing chamber 14. The mixing chamber 14 may be positioned upstream of one or more combustors 16. The cooling fluid manifold 28 may include a conduit or other appropriate device for directing fluids from the rotor cooling fluid collection chamber 24 to the mixing chamber 14.

The cooling fluid reuse system 10 may also include a pump 42 configured to pressurize the spent cooling air collected from the row one turbine vanes 22 and in the rotor cooling fluid collection chamber 24. In at least one embodiment, the pump 42 may be a mini-disc in a bore entrance pumping system. The pump 42 increases the pressure of the cooling fluids because of the pressure loss sustained by the cooling fluids passing through the turbine vanes 22. Pressurizing the cooling fluids with the pump 42 enables the pressure of the cooling fluids to be matched with the pressure of the combustor liner cooling fluids that the cooling fluids are mixed with in the mixing chamber 14.

During operation of the turbine engine 12, cooling fluids are passed from a cooling fluid source (not shown), which may be a compressor of the turbine engine 12, to the row one turbine vanes 22 to cool the turbine vanes 22. The cooling fluids may be passed through one or more cooling fluid collection channels 20 in the turbine vanes 22. The cooling fluids may then flow into the rotor cooling fluid collection chamber 24 in the rotor assembly 26 where the cooling fluids may be pressurized by a pump 42. The cooling fluids may then be passed to the cooling fluid manifold 28 and sent to the mixing chamber 14. The cooling fluids may then be mixed in the mixing chamber 14 with liner cooling air and sent into the combustor 16 for combustion. Capturing the spent cooling air from the turbine vanes 22 and directing the cooling fluids to the mixing chamber 14 to be used in the combustor 16 increases the efficiency of the turbine engine 12 by reducing the amount of cooling and leakage air consumption needed to be used as combustor liner cooling air.

The foregoing is provided for purposes of illustrating, explaining, and describing embodiments of this invention. Modifications and adaptations to these embodiments will be apparent to those skilled in the art and may be made without departing from the scope or spirit of this invention.

I claim:

1. A turbine engine, comprising:
   at least one combustor positioned upstream from a rotor assembly including a plurality of blades extending radially from a rotor;
   a first row of turbine vanes attached to a vane carrier, wherein the turbine vanes each extend radially inward and terminate proximate to the rotor assembly;
   a rotor cooling fluid collection chamber positioned in a rotating portion of the rotor assembly;
   a fluid channel directing cooling fluids from the rotor cooling fluid collection chamber to a combustor of the turbine engine; and
   at least one pump mechanically coupled to the rotor assembly for pressurizing a cooling fluid in the rotor cooling fluid collection chamber in the rotor assembly, wherein the at least one pump is positioned downstream of the first row of turbine vanes in the fluid channel that directs cooling fluids from the rotor cooling fluid collection chamber to the combustor.

2. The turbine engine of claim 1, wherein the fluid channel further comprises
   at least one cooling fluid channel in at least some of the turbine vanes in fluid communication with the rotor cooling fluid collection chamber in the rotor assembly.

3. The turbine engine of claim 2, wherein the fluid channel further comprises at least one mixing chamber positioned upstream of the at least one combustor and in fluid communication with the combustor.

4. The turbine engine of claim 3, wherein the fluid channel further comprises at least one cooling fluid manifold in fluid communication with the rotor cooling fluid collection chamber in the rotor assembly and in fluid communication with the at least one mixing chamber forming a cooling fluid reuse system of a fluid channel extending from at least one cooling fluid collection channel in the first row of turbine vanes, through the rotor cooling fluid collection chamber in the rotor assembly, through the at least one cooling fluid manifold, and into the at least one mixing chamber.

5. The turbine engine of claim 1, wherein the at least one pump comprises a mini-disc.

6. A turbine engine, comprising:
   at least one combustor positioned upstream from a rotor assembly including a plurality of blades extending radially from a rotor;
   a first row of turbine vanes attached to a vane carrier, wherein the turbine vanes each extend radially inward and terminate proximate to the rotor assembly;
   a rotor cooling fluid collection chamber positioned in a rotating portion of the rotor assembly;
   at least one cooling fluid channel in at least some of the turbine vanes in fluid communication with the rotor cooling fluid collection chamber in the rotor assembly;
   at least one mixing chamber positioned upstream of the at least one combustor and in fluid communication with the combustor;
   at least one cooling fluid manifold in fluid communication with the rotor cooling fluid collection chamber in the rotor assembly and in fluid communication with the at least one mixing chamber forming a cooling fluid reuse system of a fluid channel extending from at least one cooling fluid collection channel in the first row of turbine vanes, through the rotor cooling fluid collection chamber in the rotor assembly, through the at least one cooling fluid manifold, and into the at least one mixing chamber;
   at least one pump mechanically coupled to the rotor assembly for pressurizing a cooling fluid in the rotor cooling fluid collection chamber in the rotor assembly, wherein the at least one pump is positioned downstream of the first row of turbine vanes in the fluid channel that directs cooling fluids from the rotor cooling fluid collection chamber to the combustor.

7. The turbine engine of claim 6, wherein the at least one pump comprises a mini-disc.

* * * * *